S. A. DALAGER.
FRICTION DRIVE AUTOMOBILE ATTACHMENT.
APPLICATION FILED MAR. 23, 1916.
1,211,416.
Patented Jan. 9, 1917.
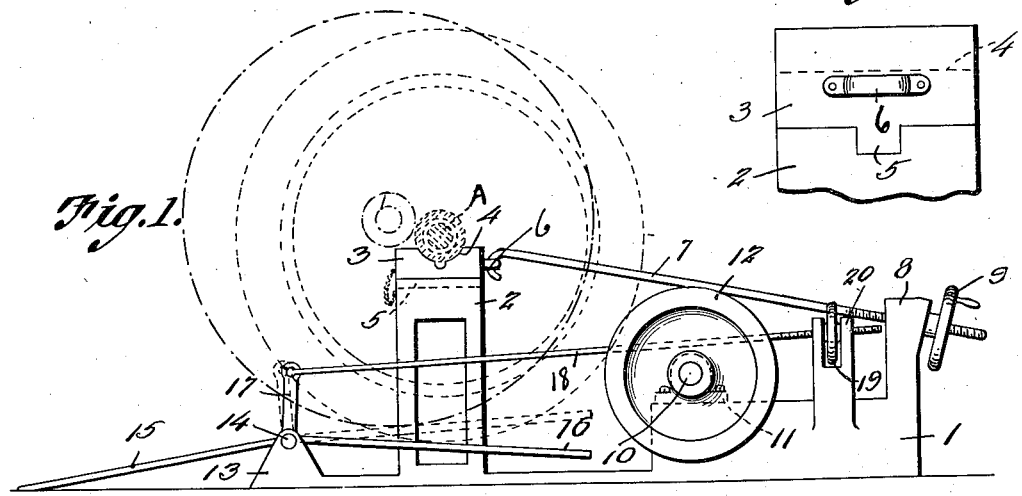
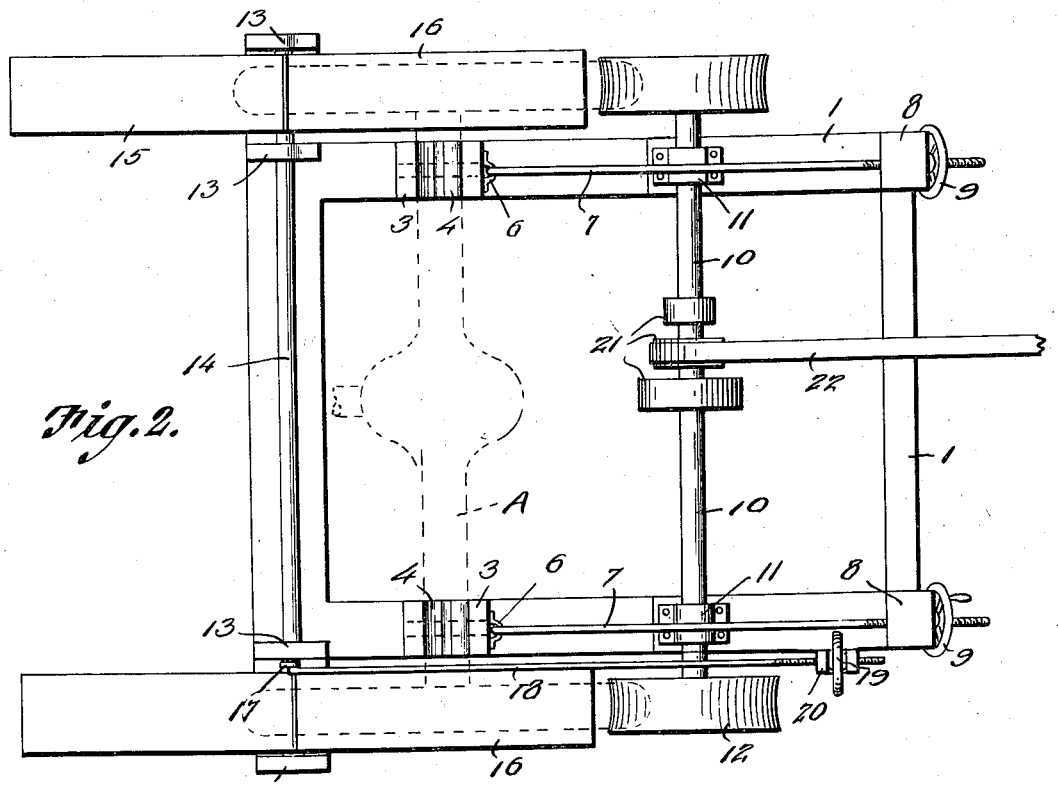

UNITED STATES PATENT OFFICE.

SOPHUS ALFRED DALAGER, OF GLENWOOD, MINNESOTA.

FRICTION-DRIVE AUTOMOBILE ATTACHMENT.

1,211,416.      Specification of Letters Patent.      Patented Jan. 9, 1917.

Application filed March 23, 1916. Serial No. 86,297.

*To all whom it may concern:*

Be it known that I, SOPHUS ALFRED DALAGER, a citizen of the United States, residing at Glenwood, in the county of Pope and State of Minnesota, have invented a new and useful Friction-Drive Automobile Attachment, of which the following is a specification.

The object of my invention is to provide a friction drive auto attachment arranged to frictionally engage both rear wheels of an automobile; to provide novel means for conveniently and quickly securing the attachment in operative engagement with the wheels of an automobile; to provide a plurality of pulleys of different diameters for driving machines at different speeds by means of the power from an automobile by the use of my attachment; to provide novel means for elevating the rear wheels of an automobile and novel means for adjustably engaging same with my friction driving members; and to provide a novel combination and arrangement of parts as hereinafter set forth.

I attain the objects of my invention by the mechanism illustrated in the accompanying drawings, in which—

Figure 1 is a side elevation; Fig. 2 is a top plan; Fig. 3 is a detail of the slidable support 3; and Fig. 4 is a detail of a modified device for adjusting the attachment directly to the rear axle of an automobile.

Similar numerals refer to similar parts throughout the several views.

Referring to the accompanying drawings, I provide a suitable frame 1, having opposite standards 2 grooved across the top and supporting a suitable slide block 3, having a projecting portion 5 engaging in the grooved portion of member 2, and having a transversely-grooved portion 4 to receive the rear axle of the automobile, as illustrated in Fig. 1. Affixed to slide block 3 is a loop 6, for engagement by a hook 7, the latter being mounted in uprights 8. Mounted on the threaded end of hook 7 and bearing against upright 8 is a suitable hand wheel 9, by which the position of the slidable block 3 is adjusted, as illustrated in the drawings.

Mounted on frame 1 by means of suitable bearings 11 is a suitable drive shaft 10, to the opposite ends of which are mounted like friction wheels 12 positioned to frictionally engage the lower portions of the rear wheels of an automobile when it is supported on slide blocks 3 as illustrated in Fig. 1.

Inclined platform members 15 provide a track for the wheels of the automobile as it is moved into position for operation on the device. The wheels pass from platforms 15 to adjustable wheel platforms 16, which may be raised or lowered in a substantially vertical direction, as illustrated in Fig. 1, members 16 being rigidly attached to a suitable rotatable or partially rotatable shaft 14, mounted in supports 13, and having suitable upright bars 17 rigidly attached to member 14 (or member 16 if preferred), and operatively connected with hand wheel 19 by means of rod 18. Member 19 is retained in the desired adjusted position by a suitable supporting member 20.

Mounted on shaft 10 are a plurality of suitable drive pulleys 21 for operating a suitable belt 22 by which any desired machine may be operated with the power obtained from an automobile by means of the attachment.

Referring to Fig. 4, A indicates an automobile axle, a modified form of hook 7 being engaged directly to the axle, and by means of threaded rod 25, is operated by a suitable handle 26, having the same function as hand wheel 9. A suitable retaining member or bolt 24 carried by member 25 bears against the upturned portion 23 of rod 7, to retain same in operative engagement with member 25, as will be apparent from the illustration. The operation of the device is substantially the same as in the other form, except that the hook is engaged directly to the axle A.

In operation, an automobile is backed slowly onto the device, its rear wheels riding up the inclined platforms 15, and onto the adjustable platforms 16. The automobile axle housing A settles into the grooved portion 4 of slide blocks 3, which may be adjusted by means of hand wheels 9 to bring the automobile wheels into the desired degree of frictional engagement with the friction wheels 12 of my attachment. Even if the engine of the automobile is not stopped at once, the automobile will be stopped by the friction wheels 12 which will revolve, preventing the automobile wheels from riding or climbing over them. Any suitable canvas covering may be attached to the automobile wheels, if found desirable, to protect the tires and to provide increased frictional resistance to friction wheels 12, such covering not being claimed as my invention and not illustrated. When the automobile is to be removed from the attachment, hooks 7 are unloosened or released by means of hand wheel 9 (or handle 26 in the form shown in Fig. 4) and hook 7 if engaged to the axle housing is unhooked therefrom. Hand wheel 19 is turned, thus raising adjustable platforms 16 and lifting the rear wheels of the automobile so as to disengage axle housing A from the grooved portion 4 of blocks 3. The car may then be started and driven away from the attachment.

In using the attachment to run a feed grinder or corn sheller which are bolted to the floor the lifting apparatus is set in line with pulley on sheller or grinder, and the automobile backed up on the attachment in proper alinement with the machine to be driven by the attachment, and the adjustable slide blocks 3 may be readily adjusted to procure the desired tension, thus saving time that would be required for readjustments if the automobile wheels were elevated by means of jacks. When the automobile has been moved into position with the axle housing A resting on slide blocks 3 members 16 are lowered so as to avoid contact with the tires when the wheels are in operation driving friction wheels 12 of the attachment. Also, it is desirable to remove pressure from the automobile wheels if the automobile is left standing on the attachment for several days, and this may readily be done by releasing the tension on hooks 7 and slide blocks 3, by hand wheels 9, as will be understood by reference to Figs. 1 and 2.

By providing a plurality of pulleys 21 on drive shaft 10 of the attachment, it will not be necessary to use the automobile speed shifting gears as much and will make possible the use of the direct drive. The largest belt pulley would, for example, be used when sawing wood, as the belt should travel very rapidly on a wood saw. In running a cream separator or any other machine requiring slow motion, the smallest belt pulley will be used. The provision of the plurality of pulleys of different diameters is therefore very useful.

What I claim is:

1. The combination in a friction drive automobile attachment of a frame, a drive shaft mounted thereon, one or more pulleys carried by the drive shaft to operate a belt at predetermined speeds, friction wheels mounted on the drive shaft and positioned to frictionally engage the rear wheels of an automobile below the horizontal median line of said wheels, means for supporting the rear wheels of the automobile in elevated position, means for longitudinally adjusting said supporting means, and means for raising and lowering the automobile wheels from the supporting means, said means including a hand wheel, elevatable wheel platform members operatively connected with the hand lever, substantially as set forth.

2. The combination in a friction drive automobile attachment of means for supporting the rear wheels of an automobile in raised position, friction drive mechanism arranged to frictionally engage said wheels, elevatable wheel platform members to raise and lower said automobile wheels to the supporting means, a hand wheel, means operatively connecting the hand wheel with the elevatable platforms, and friction regulating means including a hand wheel to adjust the supporting means.

SOPHUS ALFRED DALAGER.

Witnesses:
L. L. Hopf,
H. L. Dalager.